United States Patent
Nakanowatari et al.

(10) Patent No.: US 8,320,643 B2
(45) Date of Patent: Nov. 27, 2012

(54) FACE AUTHENTICATION DEVICE

(75) Inventors: Akihiro Nakanowatari, Tokyo (JP); Ryuuji Yamazaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 712 days.

(21) Appl. No.: 12/517,916

(22) PCT Filed: Dec. 11, 2007

(86) PCT No.: PCT/JP2007/073855
§ 371 (c)(1),
(2), (4) Date: Jun. 5, 2009

(87) PCT Pub. No.: WO2008/072622
PCT Pub. Date: Jun. 19, 2008

(65) Prior Publication Data
US 2010/0316265 A1   Dec. 16, 2010

(30) Foreign Application Priority Data
Dec. 13, 2006   (JP) ................................. 2006-335508

(51) Int. Cl.
*G06K 9/00*   (2006.01)
(52) U.S. Cl. ........................................ 382/118; 382/115
(58) Field of Classification Search .................. None
See application file for complete search history.

(56) References Cited

U.S. PATENT DOCUMENTS

| | | | | |
|---|---|---|---|---|
| 2001/0026632 A1* | 10/2001 | Tamai | ............................ | 382/116 |
| 2003/0215115 A1* | 11/2003 | Kim et al. | ...................... | 382/118 |
| 2006/0280341 A1* | 12/2006 | Koshizen et al. | ............. | 382/118 |

(Continued)

FOREIGN PATENT DOCUMENTS

JP    2002-183734 A    6/2002
(Continued)

OTHER PUBLICATIONS

Roberto Brunelli and Tomaso Poggio, "Face Recognition: Features versus Templates", Oct. 1993, IEEE Transactions on Pattern Analysis and Machine Intelligence, vol. 15, No. 10, pp. 1042-1052.*

(Continued)

*Primary Examiner* — Andrew W Johns
*Assistant Examiner* — Siamak Harandi
(74) *Attorney, Agent, or Firm* — Pearne & Gordon LLP (57) ABSTRACT

A face authentication device is provided that can perform personal identification with high accuracy regardless of an imaging environment for an input face image. The face authentication device comprises: a first similarity calculation unit (50) for calculating a similarity between a feature data item of an input face image data item and a feature data item of a face image data item registered in a face image data registration unit (30); a second similarity calculation unit (70) for calculating similarities between feature data items stored in a feature data storage (60) and the feature data item extracted by a first feature extraction unit (20); a threshold setting unit (80) for, based on the similarities calculated by the second calculation unit (70), setting a threshold for judging whether the input face image data item and the registered face image data item are of an identical person or not; and an identity determination unit (90) for determining whether the input face image data item and the registered face image data item are data items of an identical person or not by comparing the threshold set by the threshold setting unit (80) and the similarity calculated by the first similarity calculation unit (50).

8 Claims, 5 Drawing Sheets

U.S. PATENT DOCUMENTS

2007/0237367 A1* 10/2007 Yamato et al. ............ 382/118

FOREIGN PATENT DOCUMENTS

| | | | |
|---|---|---|---|
| JP | 2003-150963 | A | 5/2003 |
| JP | 2004-046697 | A | 2/2004 |
| JP | 2005-316888 | A | 11/2005 |

OTHER PUBLICATIONS

Nagao et al; "Weak Orthogonalization of Face and Perturbation for Recognition", Matsushita Research Institute Tokyo, Higashimita, Tama-ku, Kawasaki, 214 Japan, Jun. 23-25, 1998, pp. 845-852, IEEE Computer Society Conference.

Xiao et al; "Real-Time Combined 2D+3D Active Appearance Models", The Robotics Institute, Carnegie Mellon University, Pittsburg, PA 15213, 2004, pp. 535-542, IEEE Computer Society Conference.

International Search Report for PCT/JP2007/073855.

* cited by examiner

FACE AUTHENTICATION DEVICE

RELATED APPLICATIONS

This application claims the benefit of Japanese Patent Application No. 2006-335508 filed on Dec. 13, 2006 in Japan, the subject matter of which is hereby incorporated by reference.

TECHNICAL FIELD

The present invention relates to a face authentication device that uses face image data to authenticate a person.

BACKGROUND ART

In recent years, biometric authentication using a face image, a fingerprint, an iris, a blood vessel pattern, or other part of a person's body as a key has attracted attention as a security system that is convenient as it does not require carrying a key or the like, and is also less vulnerable to improper use due to loss, theft, or the like. In particular, authentication methods using a face image have an advantage that they require almost no time and effort of a person to be authenticated to register biological information required for individual authentication. That is, authentication methods using a face image does not require a finger or a hand to stick out as in fingerprint authentication or a blood vessel pattern, or does not require an eyeball to be directly irradiated with light as in iris authentication. Authentication can therefore be easily carried out even if a person to be authenticated is uncooperative in registration of biological information. Authentication methods using a face image also have an advantage that those who are authenticated have less psychological resistance compared to authentication using a fingerprint, an iris, and a blood vessel pattern.

Japanese Patent Laid-Open Application No. 2005-316888 proposes a technique about a face authentication device that authenticates by mosaicing a face image and causing a neural network to learn it. A neural network here is a mathematical model that aims to represent some properties found in the brain function by means of simulation on a computer. This technique described in the prior art document can absorb changes in the position/angle of a face and changes in lighting to perform personal authentication.

Japanese Patent Laid-Open Application No. 2002-183734 proposes a technique about an authentication device that authenticates by changing a threshold for personal authentication according to the frequency of use by a registrant. This technique described in the prior art document can dynamically change the threshold to be used for authentication according to use conditions, and can improve convenience and security.

However, the technique described in Japanese Patent Laid-Open Application No. 2005-316888 may not be able to sufficiently learn depending on the extent of changes in the position/angle of a face and the extent of changes in lighting, so that it may not be able to adequately respond to various environmental changes in an actual environment. The technique described in Japanese Patent Laid-Open Application No. 2002-183734 does not consider measures against changes in the position/angle of a face and changes in lighting at all, as it changes the threshold according only to the frequency of use by a registrant.

For example, in a case where a face image acquired by a surveillance camera is authenticated by a face authentication device, the imaging environment around the surveillance camera changes with time. So, the imaging environment at the time of registration of a face image of a particular person who is registered in advance and the imaging environment at the time of authentication of the same particular person are usually different from each other. In this case, an input face image and a registration face image of totally different persons may be judged to be similar to each other only because the imaging environment for the registration face image is close to the imaging environment for the input face image to be authenticated. That is, for example, suppose that a registration face image registered in the face authentication device was imaged in blue neon light. On the other hand, suppose that an input face image at the time of authentication was imaged in the same blue neon light. In this case, though the input face image is of a person different from the person of the registration face image, the face authentication device might judge that both images are similar to each other.

DISCLOSURE OF THE INVENTION

Problems to be Solved by the Invention

A purpose of the invention made in the above-mentioned background is to provide a face authentication device that can perform personal identification with high accuracy regardless of an imaging environment for an input face image.

Means for Solving the Problems

A face authentication device of the invention comprises: a first extraction unit for extracting a feature data item from an input face image data item; a face image data registration unit in which a face image data item imaged under a prescribed imaging condition is registered; a second extraction unit for extracting a feature data item from the face image data item registered in the face image data registration unit; a first calculation unit for checking the feature data items each extracted by the first and second extraction units against each other to calculate a similarity between both feature data items; a feature data storage for storing a plurality of feature data items each extracted from a plurality of face image data items of a plurality of persons imaged under an almost identical condition to the prescribed imaging condition; a second calculation unit for checking the feature data item extracted by the first extraction unit against the feature data items stored in the feature data storage to calculate similarities between feature data items; a threshold setting unit for, based on the similarities calculated by the second calculation unit, setting a threshold for judging whether the input face image data item and the face image data item registered in the face image data registration unit are of an identical person or not; and a determination unit for determining whether the input face image data item and the face image data item registered in the face image data registration unit are of an identical person or not by comparing the threshold set by the threshold setting unit and the similarity calculated by the first calculation unit.

Another aspect of the invention is a face authentication method, which includes: a first extraction step of extracting a feature data item from an input face image data item; a second extraction step of, referring to a face image data registration unit in which a face image data item imaged under a prescribed imaging condition is registered, extracting a feature data item from the face image data item registered in the face image data registration unit; a first calculation step of checking the feature data items each extracted in the first and second extraction steps against each other to calculate a similarity between both feature data items; a second calculation step of, referring to a feature data storage for storing a plurality of feature data items each extracted from a plurality of face image data items of a plurality of persons imaged under an almost identical condition to the prescribed imaging condition, checking the feature data item extracted in the first extraction step against the feature data items stored in the feature data storage to calculate similarities between feature data items; a threshold setting step of, based on the similarities calculated in the second calculation step, setting a threshold for judging whether the input face image data item and the face image data item registered in the face image data registration unit are of an identical person or not; and a determination step of determining whether the input face image data item and the face image data item registered in the face image data registration unit are of an identical person or not by comparing the threshold set in the threshold setting step and the similarity calculated in the first calculation step.

Another aspect of the invention is a face authentication program, which causes a computer to execute the process of the above-described face authentication method.

Advantages of the Invention

The invention can provide a face authentication device that has an advantage of being able to perform personal identification with high accuracy regardless of an imaging environment for an input face image.

As described hereafter, other aspects of the invention exist. Thus, this summary of the invention is intended to provide a few aspects of the invention and is not intended to limit the scope of the invention described and claimed herein.

DESCRIPTION OF THE SYMBOLS 1, 1a: Face authentication device
10: Face image data acquisition unit
20: First feature extraction unit
30: Face image data registration unit
40: Second feature extraction unit
50: First similarity calculation unit
60, 61: Feature data storage
611-61n: First to nth sub-feature data storage
70, 70a: Second similarity calculation unit
80: Threshold setting unit
90: Identity determination unit
100, 100b: Feature data classification unit
110: Sub-feature data storage choice unit
120: Feature data update judgment unit

BEST MODE OF EMBODYING THE INVENTION

The present invention will be described below in detail. The following detailed description and the accompanying drawings do not limit the invention. Instead, the scope of the invention is defined by the appended claims.

A face authentication device of the invention comprises: a first extraction unit for extracting a feature data item from an input face image data item; a face image data registration unit in which a face image data item imaged under a prescribed imaging condition is registered; a second extraction unit for extracting a feature data item from the face image data item registered in the face image data registration unit; a first calculation unit for checking the feature data items each extracted by the first and second extraction units against each other to calculate a similarity between both feature data items; a feature data storage for storing a plurality of feature data items each extracted from a plurality of face image data items of a plurality of persons imaged under an almost identical or substantially same condition to the prescribed imaging condition; a second calculation unit for checking the feature data item extracted by the first extraction unit against the feature data items stored in the feature data storage to calculate similarities between feature data items; a threshold setting unit for, based on the similarities calculated by the second calculation unit, setting a threshold for judging whether the input face image data item and the face image data item registered in the face image data registration unit are of an identical person or not; and a determination unit for determining whether the input face image data item and the face image data item registered in the face image data registration unit are of an identical person or not by comparing the threshold set by the threshold setting unit and the similarity calculated by the first calculation unit. This configuration allows a threshold to be set in accordance with an input face image data item, and therefore allows personal identification to be performed with high accuracy regardless of an imaging environment for an input face image.

The feature data storage may have a plurality of sub-feature data storages for storing feature data items extracted from face image data items imaged under different imaging conditions with the feature data items being classified into the plurality of sub-feature data storages according to the difference of the imaging conditions, and the second calculation unit may check the feature data item extracted by the first extraction unit against the feature data items stored in one of the sub-feature data storages corresponding to the imaging condition closest to the prescribed imaging condition for the face image data item registered in the face image data registration unit, and calculate the similarities between feature data items. This configuration allows the feature data storage to be divided and classified according to each imaging condition, and therefore allows personal identification to be performed with high accuracy regardless of an imaging environment for an input face image even if the imaging condition for the input face image data item is varied.

The face authentication device, when a new face image data item is registered in the face image data registration unit, may store a feature data item of the new face image data item extracted by the second extraction unit in one of the plurality of sub-feature data storages corresponding to the imaging condition closest to that for the new face image data item. In this configuration, when a feature data item of a new face image data item is added, the feature data item can be classified into and stored in the most appropriate sub-feature data storage.

The first calculation unit may calculate the similarity between the feature data items extracted by the first and second extraction units based on a distance between both feature data items. In this configuration, a similarity between feature data items extracted by the first and second extraction units can be easily calculated.

The second calculation unit may calculate the similarities between the feature data item extracted by the first extraction unit and the feature data items stored in the feature data storage based on distances between feature data items. In this configuration, a similarity between feature data items can be easily calculated.

The threshold setting unit, based on an average value and a variance value of the similarities calculated by the second calculation unit, may set the threshold for judging whether the input face image data item and the face image data item registered in the registration unit are of an identical person or not. In this configuration, a threshold suitable for personal identification can be set easily.

First Embodiment

A face authentication device according to a first embodiment (hereinafter referred to as the "embodiment 1") of the invention will be described below with reference to drawings. Illustrated in the embodiment is a case of a face authentication device that uses face image data to authenticate a person and is used for open/close authentication of a door of a room, authentication of use of a mobile phone, or the like.

Figure 1:
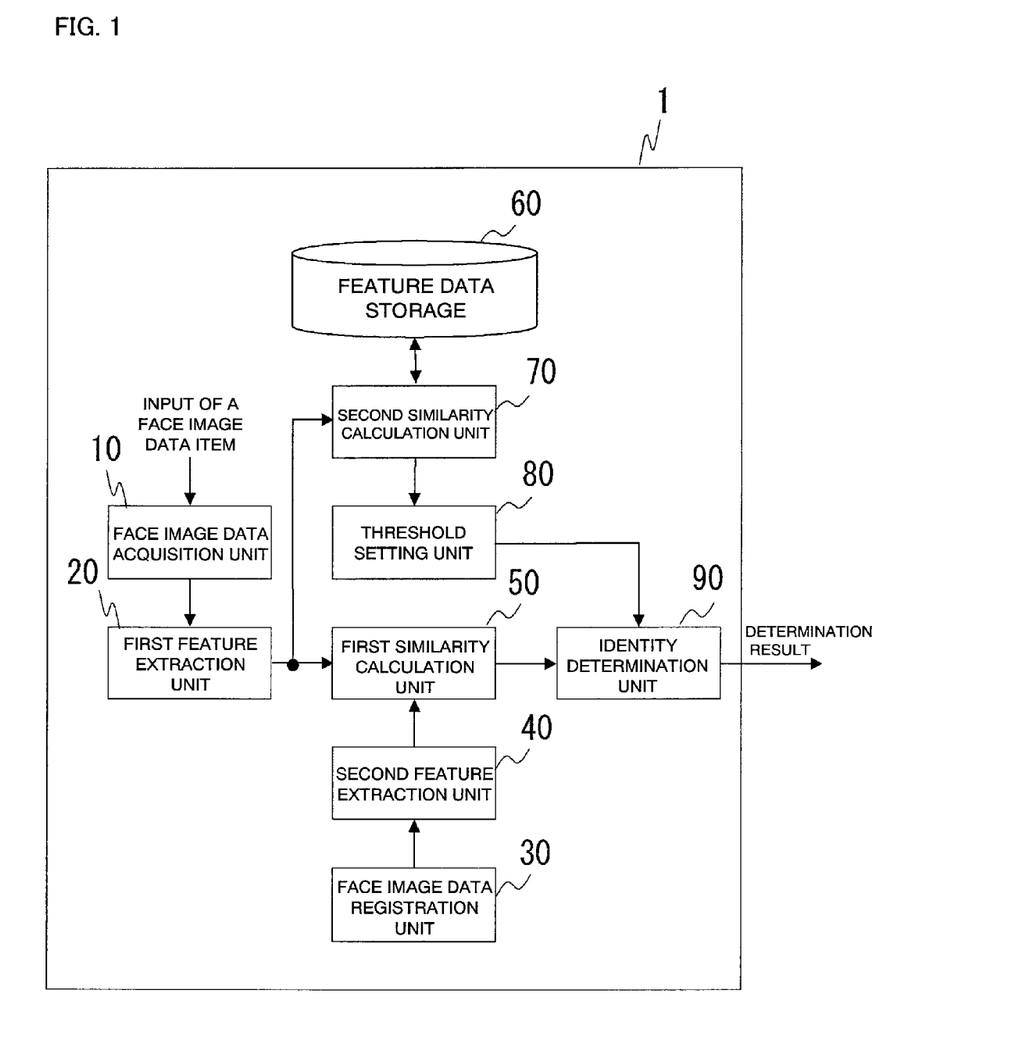
FIG. 1 is a block diagram schematically showing a configuration of a face authentication device according to the embodiment 1 of the invention.

FIG. 1 is a block diagram schematically showing a configuration of a face authentication device according to the embodiment 1 of the invention.

As shown in FIG. 1, a face authentication device 1 according to the embodiment 1 of the invention comprises a face image data acquisition unit 10, a first feature extraction unit 20, a face image data registration unit 30, a second feature extraction unit 40, a first similarity calculation unit 50, a feature data storage 60, a second similarity calculation unit 70, a threshold setting unit 80, and an identity determination unit 90.

The face image data acquisition unit 10 acquires face image data inputted, for example, from a video camera, an image scanner, or the like.

The first feature extraction unit 20 extracts feature data from face image data inputted to the face image data acquisition unit 10. The second feature extraction unit 40 extracts feature data from face image data registered in the face image data registration unit 30.

Specifically, the first and second feature extraction units 20 and 40, for example, based on the position or the like of eyes, nose, and mouth in face image data, cut out a face area in the face image data to a fixed size and shape, and extract feature data "x" that is feature data converted from a one-dimensional vector "v" whose element is a luminance value of pixels in the whole cut-out area.

As a method of converting "v" into the data "x", which is suitable for personal authentication, there are proposed, for example, a method described in "Weak Orthogonalization of Face and Perturbation, CVPR 1998, Kenji Nagao, Masaki Sohma," and the like.

In the above method, a plurality of images of an identical person shot under various shooting conditions are prepared for a plurality of persons first, and one-dimensional vectors are obtained from these images. Then, in this method, from a perturbation component distribution, which is a variation component in an identical person, and from an interindividual variation component distribution, which is a variation component between different persons, are obtained covariance matrices "Σ1" and "Σ2" of their respective feature vector distributions, and a matrix "L" is obtained that simultaneously diagonalizes the two covariance matrices "Σ1" and "Σ2".

In this regard, the relations between the matrix "L" and the covariance matrices "Σ1" and "Σ2" are shown in Equations (1) and (2):

$$L\Sigma_1 L^T = \Lambda^{(1)} \quad (1)$$

$$L\Sigma_2 L^T = \Lambda^{(2)} \quad (2)$$

Since "L" is a diagonal matrix, "Λ(1)" and "Λ(2)" of Equations (1) and (2) are expressed as shown in Equations (3) and (4):

$$\Lambda^{(1)} = \text{diag}[\lambda_1^{(1)}, \lambda_2^{(1)}, \ldots] \quad (3)$$

$$\Lambda^{(2)} = \text{diag}[\lambda_1^{(2)}, \lambda_2^{(2)}, \ldots] \quad (4)$$

By using values of diagonal components of the diagonalized matrix "L", "Γ" is generated from Equations (3) and (4) as shown in Equation (5) described below. There are various other generation methods of generating "Γ" than Equation (5). These generation methods may be used to generate "Γ".

$$\Gamma = \text{diag}[(\lambda_1^{(1)}\lambda_1^{(2)})^{-1/2}, (\lambda_2^{(1)}\lambda_2^{(2)})^{-1/2}, \ldots] \quad (5)$$

Then, the one-dimensional vector "v" whose element is a luminance value of pixels in the whole cut-out area is multiplied by a matrix "Ψ" shown in Equation (6) described below. This multiplication is "x=Ψ·v". This can convert the vector "v" into a feature suitable for personal identification. The matrix "Ψ" can be obtained from "Γ" and the diagonal matrix "L" as shown in Equation (6):

$$\Psi = \Gamma L \quad (6)$$

As above, the first and second feature extraction units 20 and 40, based on the position or the like of eyes, nose and mouth in face image data, cut out a face area in the face image data to a fixed size and shape, convert it into data suitable for personal authentication, and thereby extract feature data.

Face image data imaged under a prescribed imaging condition is registered in advance in the face image data registration unit 30.

The first similarity calculation unit 50 checks feature data items each extracted by the first and second feature extraction units 20 and 40 against each other, and calculates a similarity between both feature data items. A distance between both features is calculated as the similarity. That is, the first similarity calculation unit 50 regards series of elements of feature data items each extracted by the first and second feature extraction units 20 and 40 as one-dimensional vectors, and calculates a distance between both vectors. As a method of calculating a distance between both vectors there is, for example, a method that uses the L1 norm or L2 norm of the difference between the feature vectors. For another example, there is a method that uses a correlation value between the feature vectors. These methods can be used. As above, by calculating a distance between feature data items extracted by the first and second extraction units, a similarity between both feature data items can be easily calculated.

The feature data storage 60 stores a plurality of feature data items each extracted from face image data items of a plurality of persons imaged under an almost identical or substantially same condition to the imaging condition for the face image data item registered in the face image data registration unit 30. The above plurality of feature data items stored in the feature data storage 60 are each extracted from face image data items of persons who are different from one another. The plurality of feature data items stored in the feature data storage 60 are extracted, for example, by the second feature extraction unit

40. However, the extraction is not limited to this, and the plurality of feature data items may also be extracted by the first feature extraction unit 20. Alternatively, a plurality of feature data items may be extracted in advance from face image date items of persons different from one another, and then the plurality of feature data items may be stored in the feature data storage 60.

The second similarity calculation unit 70 checks a feature data item extracted by the first extraction unit 20 against each of feature data items stored in the feature data storage 60 to calculate similarities between feature data items. Also in this calculation, a distance between both features is calculated as the similarity. By calculating a distance between feature data items extracted by the first and second extraction units, a similarity between both feature data items can be calculated as shown in Equation (7):

$$\text{Similarity}=1/(1+\text{Distance}) \quad (7)$$

For example, in a case where feature data items of N persons are stored in the feature data storage 60, the second similarity calculation unit 70 calculates N between-feature distances.

The threshold setting unit 80 sets a threshold suitable for personal identification, based on similarities data calculated by the second similarity calculation unit 70. That is, the threshold setting unit 80, based on similarities calculated by the second similarity calculation unit 70, sets a threshold for judging whether an input face image data item and a face image data item registered in the face image data registration unit 30 are of an identical person or not.

Now, suppose a case where the feature data storage 60 stores a feature data item of a person corresponding to a face image data item to be authenticated which is inputted to the face image data acquisition unit 10. In this case, among N feature similarities calculated by the second similarity calculation unit 70, (N−1) feature similarities except the maximum value are first prepared. Thus excluding the maximum value from the N feature similarities allows a similarity between face image data items of the identical person to be eliminated in advance.

After that, assuming that the (N−1) feature similarities has a normal distribution, the threshold setting unit 80 calculates an average value and a variance value from the (N−1) feature similarities. Based on the result, the threshold setting unit 80 calculates a probability of similarity between a face image data item to be authenticated which is inputted to the face image data acquisition unit 10 and face image data items of a plurality of other persons stored in the feature data storage 60. Then, a threshold suitable for personal identification is set in accordance with an acceptable false acceptance rate. Using an average value and a variance value calculated from the (N−1) feature similarities allows a threshold suitable for personal identification to be set easily.

The identity determination unit 90 determines whether an input face image data item and a face image data item registered in the face image data registration unit 30 are of an identical person or not by comparing a threshold set by the threshold setting unit 80 and a similarity calculated by the first similarity calculation unit 50.

Figure 2:
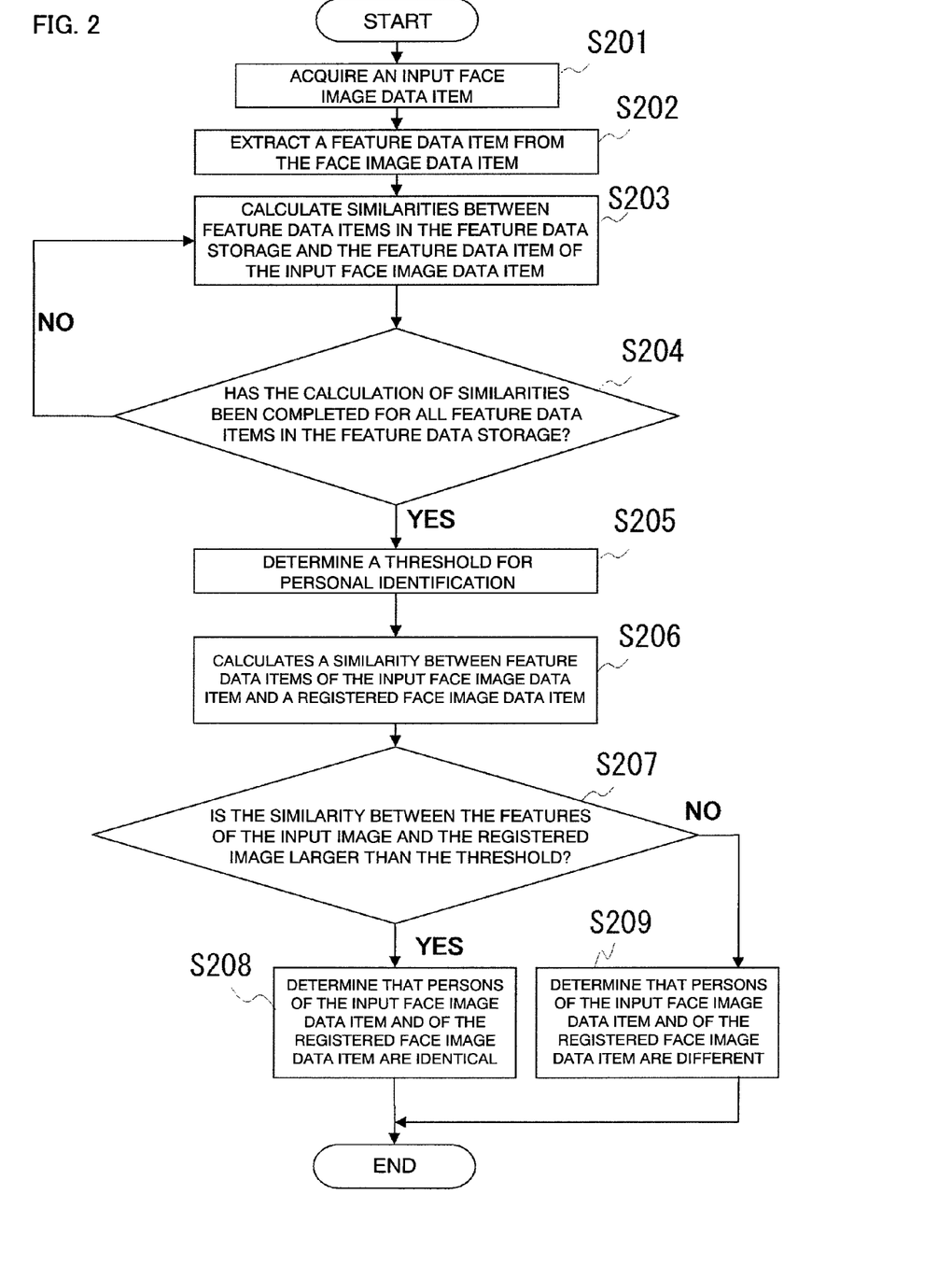
FIG. 2 is an operation flowchart of the face authentication device according to the embodiment of the invention.

An operation of the above-configured face authentication device 1 according to the embodiment 1 of the invention will next be described based on a drawing. FIG. 2 is an operation flowchart of the face authentication device according to the embodiment of the invention.

As shown in FIG. 2, the face image data acquisition unit 10 acquires a face image data item inputted from a camera, a scanner, or the like (S201). A feature is then extracted from the face image data item acquired by the face image data acquisition unit 10 (S202). The second similarity calculation unit 70 then checks each of feature data items stored in the feature data storage 60 and the feature data item of the input face image data item against each other, and calculates similarities between feature data items. Similarity in feature between each feature data item pair is calculated here (S203).

Then, if the second similarity calculation unit 70 has completed the calculation of similarities between all feature data items stored in the feature data storage 60 and the feature data item of the input face image data item (YES at S204), the threshold setting unit 80 sets a threshold for personal identification, based on the similarities calculated by the second similarity calculation unit 70 (S205). If the second similarity calculation unit 70 has not completed the calculation of similarities between all feature data items stored in the feature data storage 60 and the feature data item of the input face image data item (NO at S204), the process of S203 is repeated.

The first similarity calculation unit 50 then calculates a similarity between feature data items of the input face image data item and a registered face image data item (S206). Specifically, the first similarity calculation unit 50 checks the feature data item extracted by the first feature extraction unit 20 and a feature data item extracted by the second feature extraction unit 40 from a face image registered in the face image data registration unit 30 against each other, and calculates a similarity between both feature data items.

The identity determination unit 90 then compares the threshold set by the threshold setting unit 80 and the similarity calculated by the first similarity calculation unit 50 (S207). Then, if the similarity calculated by the first similarity calculation unit 50 is larger than the threshold (S207), the identity determination unit 90 determines that the input face image data item and the face image data item registered in the face image data registration unit 30 are data items of an identical person (S208). On the other hand, if the similarity calculated by the first similarity calculation unit 50 is smaller than the threshold (S207), the identity determination unit 90 determines that the input face image data item and the face image data item registered in the face image data registration unit 30 are data items of different persons (S209).

Figure 3:
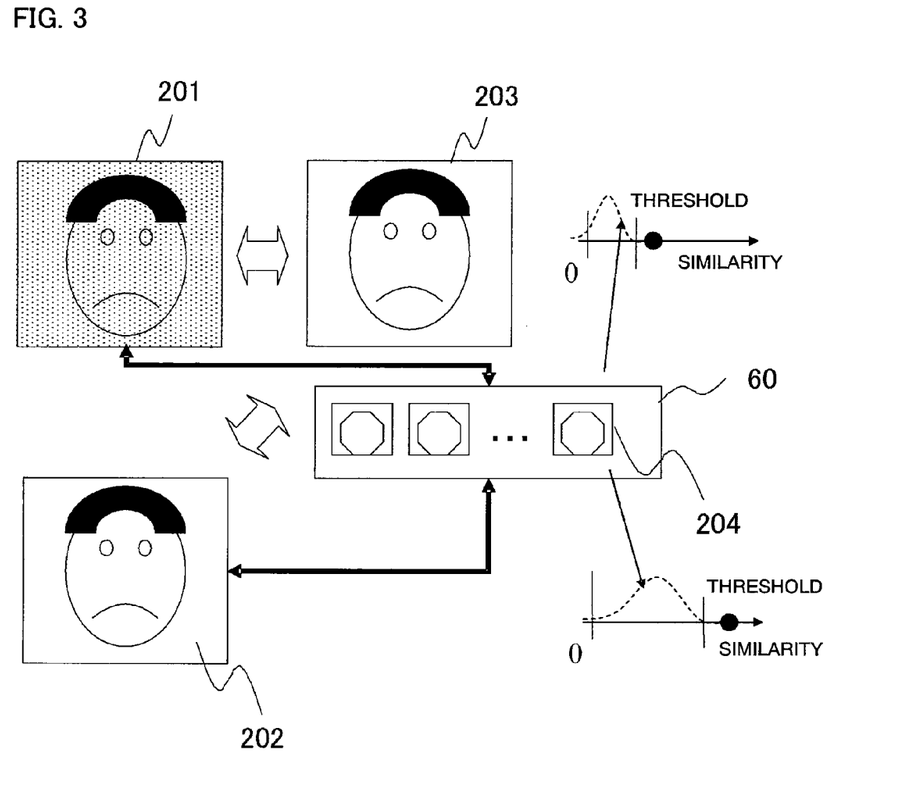
FIG. 3 is a schematic drawing illustrating the principle of the face authentication device according to the embodiment 1 of the invention.

The principle of the face authentication device according to the embodiment 1 of the invention will next be specifically described based on a drawing. FIG. 3 is a schematic drawing illustrating the principle of the face authentication device according to the embodiment 1 of the invention.

As shown in FIG. 3, suppose that input face images 201 and 202, which are face image data items inputted to the face image data acquisition unit 10, and registration face image 203, which is a face image data item registered in the face image data registration unit 30, all correspond to an identical person, where the input face image 201 and the registration face image 203 are imaged in imaging environments significantly different from each other in the intensity and direction of illumination or the like, and where the input face image 202 and the registration face image 203 are imaged in imaging environments close to each other.

Generally in face authentication, a similarity, which indicates that persons are identical, tends to be higher between face images whose imaging environments are closer to each other. The similarity therefore tends to be higher when authentication is performed between the input face image 202 and the registration face image 203 than when authentication is performed between the input face image 201 and the registration face image 203. Also in the calculation of a similarity between different persons, the similarity between face images imaged in significantly different imaging environments tends to be low, and the similarity between face images imaged in imaging environments close to each other tends to be high. Since the similarity appears differently according to the difference between imaging environments for input face images as above, the threshold requires to be set low when the similarity tends to be low, and to be set high when the similarity tends to be high.

So, in the face image authentication device 1 according to the embodiment 1 of the invention, face images 204 of a plurality of persons imaged in the same imaging environment as the registration face image 203 are prepared in advance, and feature data items of these face images of the plurality of persons are stored in the feature data storage 60. The plurality of face images 204 imaged in the same imaging environment as the registration face image 203 are schematically shown in the feature data storage 60 in FIG. 3. By the second similarity calculation unit 70 calculating a similarity between each feature data item of the above plurality of face images 204 in the feature data storage 60 and a feature data item of an input face image, a distribution of similarity can also be acquired.

For example, similarities between a feature data item of the input face image 201, imaged in an imaging environment different from the imaging environment for the registration face image 203, and feature data items of the plurality of face images 204 stored in the feature data storage 60 tend to be low. On the other hand, similarities between a feature data item of the input face image 202, imaged in an imaging environment close to the imaging environment for the registration face image 203, and feature data items of the plurality of face images 204 stored in the feature data storage 60 tend to be high.

A threshold is then set in accordance with the distribution of similarity calculated by the second similarity calculation unit 70. This allows the threshold to be set low when the similarity tends to be low, and to be set high when the similarity tends to be high, so that personal identification can be performed with high accuracy regardless of an imaging environment for an input face image.

The above face authentication device 1 according to the embodiment 1 of the invention is provided with: the feature data storage 60 that stores a plurality of feature data items each extracted from a plurality of face image data items of a plurality of persons imaged under an almost identical condition to an imaging condition for a face image data item registered in the face image data registration unit 30; the second similarity calculation unit 70 that checks the feature data item extracted by the first feature extraction unit 20 against the feature data items stored in the feature data storage 60 to calculate similarities between feature data items; and the threshold setting unit 80 that, based on the similarities calculated by the second similarity calculation unit 70, sets a threshold for judging whether the input face image data item and the face image data item registered in the face image data registration unit 30 are of an identical person or not. This configuration allows a threshold to be set in accordance with an input face image data item, and allows personal identification to be performed with high accuracy regardless of an imaging environment for an input face image.

Second Embodiment

Figure 4:
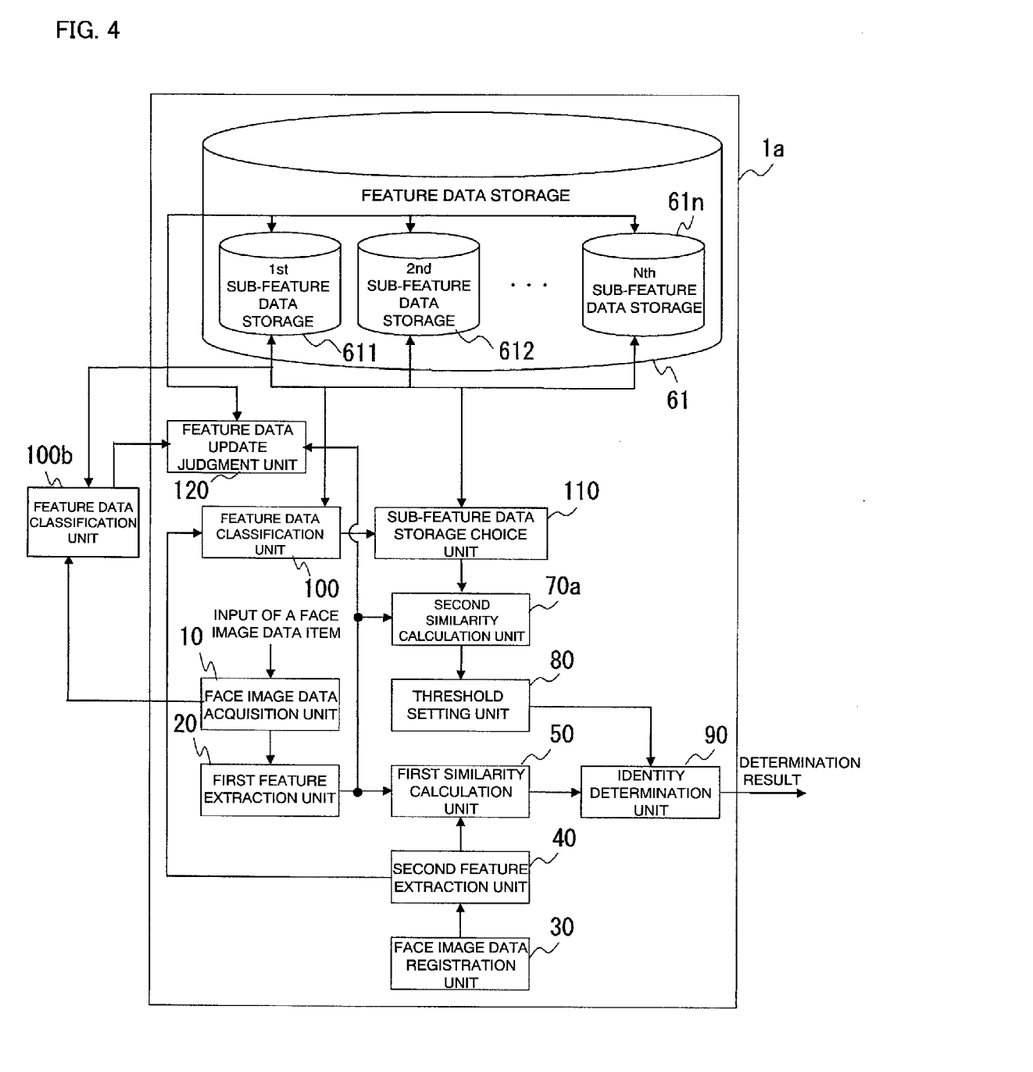
FIG. 4 is a block diagram schematically showing a configuration of a face authentication device according to the embodiment 2 of the invention.

A face authentication device according to a second embodiment (hereinafter referred to as the "embodiment 2") will be described below with reference to drawings. FIG. 4 is a block diagram schematically showing a configuration of a face authentication device according to the embodiment 2 of the invention.

The feature data storage 60 of the face image authentication device 1 according to the embodiment 1 of the invention does not have any sub-feature data storage, as shown in FIG. 1. In contrast to this, as shown in FIG. 4, a feature data storage 61 of a face image authentication device 1a according to the embodiment 2 of the invention has a plurality of sub-feature data storages 611 to 61n, and is different from the embodiment 1 in this respect.

Also as shown in FIG. 4, the face image authentication device 1a according to the embodiment 2 of the invention is different from the face image authentication device 1 according to the embodiment 1 of the invention in that the face image authentication device 1a has feature data classification units 100 and 100b, a sub-feature data storage choice unit 110, and a feature data update judgment unit 120.

As shown in FIG. 4, the face authentication device 1a according to the embodiment 2 of the invention comprises a face image data acquisition unit 10, a first feature extraction unit 20, a face image data registration unit 30, a second feature extraction unit 40, a first similarity calculation unit 50, the feature data storage 61, the plurality of sub-feature data storages 611 to 61n, a second similarity calculation unit 70a, a threshold setting unit 80, an identity determination unit 90, the feature data classification units 100 and 100b, the sub-feature data storage choice unit 110, and the feature data update judgment unit 120. As described later, the feature data classification units 100 and 100b have the same function.

As shown in FIG. 4, the feature data storage 61 has the plurality of sub-feature data storages 611 to 61n. A plurality of feature data items each extracted from face image data items of a plurality of persons imaged under different imaging conditions are classified according to the above different imaging conditions and stored in the plurality of sub-feature data storages 611 to 61n.

In this description, for example, the feature data storage 61 has n sub-feature data storages 611 to 61n. These sub-feature data storages 611 to 61n are classified, for example, by the direction of a face into classes such as the front, looking-up, looking-down, looking-left, and looking-right.

The second similarity calculation unit 70a checks a feature data item extracted by the first feature extraction unit 20 against a plurality of feature data items stored in a sub-feature data storage, among the plurality of sub-feature data storages 611 to 61n, corresponding to an imaging condition closest to a prescribed imaging condition for a face image data item registered in the face image data registration unit 30, and calculates similarities between feature data items.

The feature data classification unit 100, referring to the plurality of sub-feature data storages 611 to 61n, determines which sub-feature data storage corresponds to face image data items close to a face image data item registered in the face image data registration unit 30, and classifies the registered face image data item. For example, the feature data classification unit 100 determines which class among the front, looking-up, looking-down, looking-left, and looking-right the direction of the face image data item belongs to.

The sub-feature data storage choice unit 110 is connected to the plurality of sub-feature data storages 611 to 61n, the second similarity calculation unit 70a, and the feature data classification unit 100. In accordance with a classification result obtained by the feature data classification unit 100, the sub-feature data storage choice unit 110 chooses a sub-feature data storage, among the plurality of sub-feature data storages 611 to 61n, corresponding to an imaging condition closest to the prescribed imaging condition for a face image data item registered in the face image data registration unit 30.

The feature data update judgment unit 120 is connected to the plurality of sub-feature data storages 611 to 61n, and to outputs of the first feature extraction unit 20 and the feature data classification unit 100b. As is the case with the feature data classification unit 100, the feature data classification unit 100b determines which of the sub-feature data storages 611 to 61 corresponds to a face image data item acquired by the face image data acquisition unit 10, and classifies the acquired face image data item. Based on a classification result obtained by the feature data classification unit 100b and using a feature data item extracted by the first feature extraction unit 20, the feature data update judgment unit 120 updates feature data items stored in the plurality of sub-feature data storages 611 to 61n. That is, when a new face image data item is inputted, the feature data update judgment unit 120 stores a feature data item of the new face image data item extracted by the first feature extraction unit 20 in a sub-feature data storage, among the plurality of sub-feature data storages 611 to 61n, corresponding to an imaging condition closest to the imaging condition for the new face image data item. In this way, the feature data update judgment unit 120 updates data in the feature data storage 61.

Figure 5:
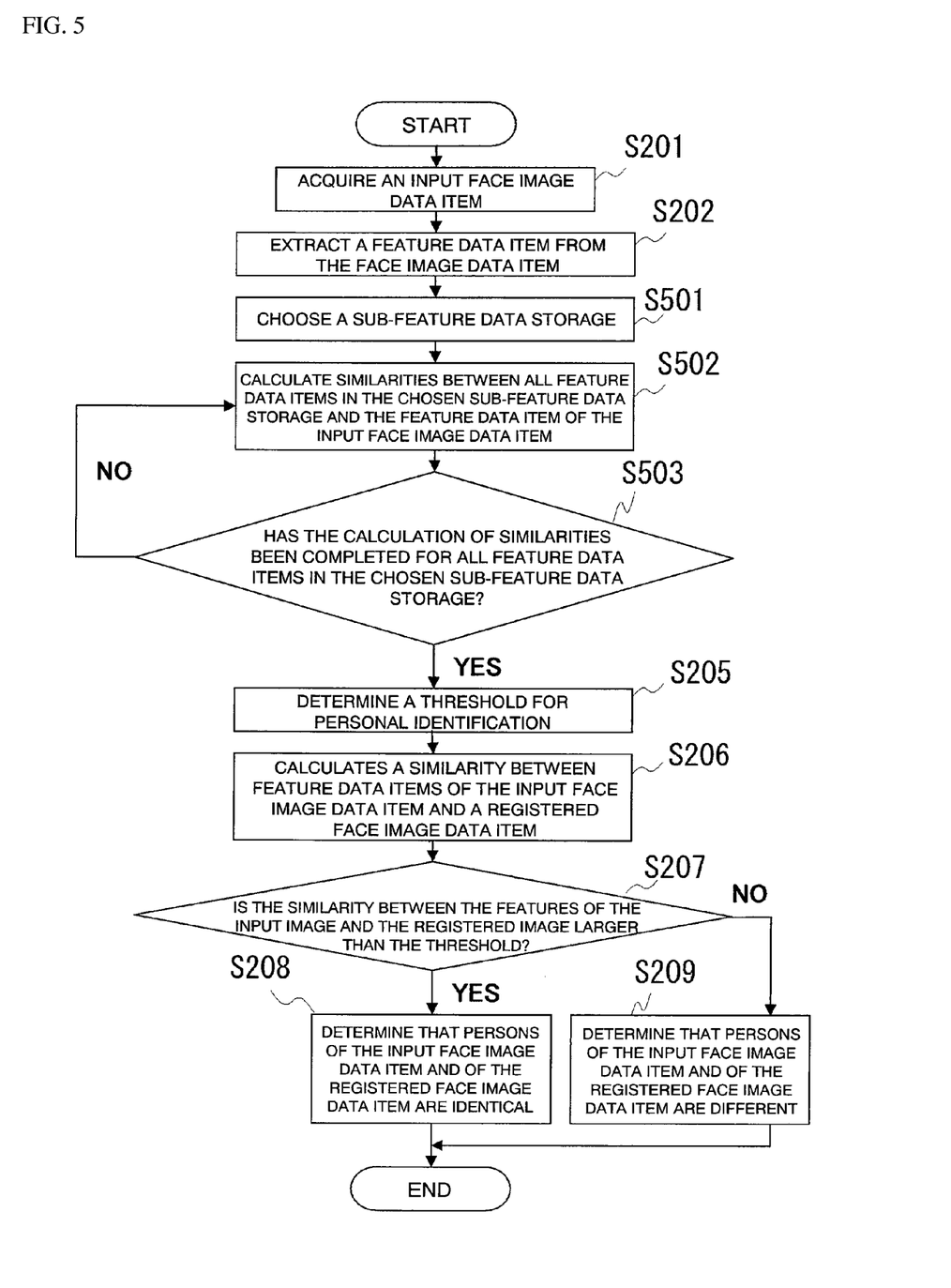
FIG. 5 is an operation flowchart of the face authentication device according to the embodiment 2 of the invention.

An operation of the above-configured face authentication device 1a according to the embodiment 2 of the invention will next be described based on a drawing. FIG. 5 is an operation flowchart of the face authentication device according to the embodiment 2 of the invention. FIGS. 2 and 5 are different in that S501 is added, S502 is added in place of S203, and S503 is added in place of S204.

As shown in FIG. 5, the face image data acquisition unit 10 acquires a face image data item inputted from a camera, a scanner, or the like (S201). A feature is then extracted from the face image data item acquired by the face image data acquisition unit 10 (S202).

Then, the sub-feature data storage choice unit 110 chooses a sub-feature data storage, among the plurality of sub-feature data storages 611 to 61n in the feature data storage 61, corresponding to an imaging condition closest to the prescribed imaging condition for a face image data item registered in the face image data registration unit 30 (S501).

Specifically, the feature data classification unit 100, referring to the sub-feature data storages 611 to 61n, first determines which sub-feature data storage among the plurality of sub-feature data storages 611 to 61n corresponds to face image data items close to a face image data item registered in the face image data registration unit 30, and classifies the registered face image data item.

Then, based on the feature data item classified by the feature data classification unit 100, the sub-feature data storage choice unit 110 chooses a sub-feature data storage, among n sub-feature data storages 611 to 61n, corresponding to an imaging condition closest to the prescribed imaging condition for the face image data item registered in the face image data registration unit 30. The sub-feature data storage choice unit 110 then inputs information on the chosen sub-feature data storage to the second similarity calculation unit 70a.

The operation of the feature data classification unit 100 will be specifically described here. The feature data classification unit 100, referring to the sub-feature data storages 611 to 61n, determines which sub-feature data storage among the plurality of sub-feature data storages 611 to 61n corresponds to face image data items to which a face image data item registered in the face image data registration unit 30 is close, and classifies the registered face image data item.

In a case where the plurality of sub-feature data storages 611 to 61n are classified according to the direction of a face, the direction of a face can be determined, for example, by a method described in "Real-Time Combined 2D+3D Active Appearance Models, J. Xiao, S. Baker, I. Matthews, and T. Kanade, Proceedings of the IEEE Conference on Computer Vision and Pattern Recognition, June, 2004," or the like.

An AAM (Active Appearance Model) based estimation method for the two-dimensional shape, three-dimensional shape, and face direction will be described here. An AAM comprises two linear models: a shape model and a texture model, and can represent many face variations by providing the shape and texture models with arbitrary parameters. The shape model employs a two-dimensional coordinate system, and the texture model is represented as information on luminance on a statistical average shape. In feature point detection using an AAM, a parameter of the AAM that minimizes the difference between the model and an input face image is determined, and information on the two-dimensional position is acquired from the shape model of that parameter.

At this point, the two-dimensional shape can be represented by a two-dimensional projection (projection matrix P) of the three-dimensional shape. Added with this constraint condition of the three-dimensional shape, the condition to determine the AAM that matches the input face image is given by Expression (8), where "I" is the input face image, "$s_{2D}$" is the two-dimensional model, and "$s_{3D}$" is the three-dimensional shape model:

$$\sum_x [I(x) - AAM(x)]^2 + K[s_{2D} - Ps_{3D}]^2 \qquad (8)$$

In the above expression, "K" is a weighting factor, and the larger the value of "K" is, the stronger the constraint of the three-dimensional shape is. If a parameter that minimizes Expression (8) is determined, the three-dimensional shape and the projection matrix (i.e. the direction of the face) can be determined as well as the position of the feature point.

Then, the second similarity calculation unit 70a calculates similarities between all feature data items in the sub-feature data storage chosen by the sub-feature data storage choice unit 110 and the feature data item of the face image data item extracted by the first feature extraction unit 20. Values of distances between feature data items are calculated here (S502).

Then, if the second similarity calculation unit 70a has completed the calculation of similarities between all feature data items stored in the chosen sub-feature data storage and the feature data item of the input face image data item (YES at S503), the threshold setting unit 80 sets a threshold for personal identification, based on the similarities calculated by the second similarity calculation unit 70a (S205). If the second similarity calculation unit 70a has not completed the calculation of similarities between all feature data items stored in the chosen sub-feature data storage and the feature data item of the input face image data item (NO at S503), the process of S502 is repeated.

The first similarity calculation unit 50 then calculates a similarity between feature data items of the input face image data item and a registered face image data item (S206). Specifically, the first similarity calculation unit 50 calculates distances between the feature data item extracted by the second feature extraction unit 40 and the feature data item extracted by the first feature extraction unit 20.

The identity determination unit 90 then compares the threshold set by the threshold setting unit 80 and the similarity calculated by the first similarity calculation unit 50 (S207). Then, if the similarity calculated by the first similarity calculation unit 50 is larger than the threshold (YES at S207), the identity determination unit 90 determines that the input face image data item and the face image data item registered in the face image data registration unit 30 are data items of an identical person (S208). On the other hand, if the similarity calculated by the first similarity calculation unit 50 is smaller than the threshold (NO at S207), the identity determination unit 90 determines that the input face image data item and the face image data item registered in the face image data registration unit 30 are data items of different persons (S209).

Various conditions, as well as the direction of a face, can be used for the feature data classification unit 100 and the criterion for classifying the plurality of sub-feature data storages 611 to 61n that are classified by the feature data classification unit 100. For example, the following can be used: the date and time when the face image data acquisition unit 10 acquired a face image; weather information at the time when the face image data acquisition unit 10 acquired a face image; the imaging position of a face image; the setting angle at the time of imaging a face image; the presence or absence of a mask, sunglasses, or other accessories; the lighting conditions at the imaging location; or the like. Regarding such shooting conditions, the classification can be done with reference to imaging conditions or the like different from one another.

If the classification is done in accordance with the condition of a face, such as a mask, sunglasses, and glasses, boosting or an SVM (Support Vector Machine), for example, can be used to determine whether accessories exist on a face or not.

Boosting is known as a general technique for constructing a binary discriminator (e.g. for determining the presence or absence of glasses). A strong classifier is generated by preparing many weak discriminators each of which is assigned with various weights. Among commonly used techniques is adaBoost. In adaBoost, discriminators are chosen one after another. The weight for a learning data item incorrectly discriminated by the previously chosen discriminator is increased and, consequently, focused learning is performed on that learning data item. A chosen discriminator is given with confidence "$\alpha$" in accordance with its error rate. A discrimination result depends on a majority vote taken by discriminators weighted with confidence "$\alpha$".

SVMs, too, are known as a general technique for constructing a discriminator of values (e.g. for determining the presence or absence of glasses). A hyperplane that passes through the center of two classes is determined to solve a two-class classification problem. In order to carry out the above, a minimum distance between a hyperplane and a training sample is used as an evaluation function, and a hyperplane is determined such that the evaluation function is maximized. An SVM, as it is, is a linear discriminator. However, it can form a nonlinear discriminator by using the kernel trick.

If the plurality of sub-feature data storages 611 to 61n are classified by lighting environments, categories are determined for variations in lighting. Specifically, for example, in a feature generation method described in "Weak Orthogonalization of Face and Perturbation, CVPR 1998, Kenji Nagao, Masaki Sohma," a low-dimensional factor is a component of a general variation of a face. If many variations in the shooting environment and lighting conditions are used as perturbation components in one person, a component representing a change in the shooting environment and variations in lighting appears in the distribution's main component. If this basis vector is used to construct a subspace, a subspace mainly indicating variations in lighting can be obtained. In this subspace, input data is classified by using the proximity of data of each category to the distribution.

A technique that explicitly estimates the direction and intensity of illumination can be used as shown below. As shown in Equation (9), a light source "s" can be estimated by the least-squares method, by using an average "$B_{avr}$" of a normal albedo matrix "B(l)" determined in advance by statistic calculation.

$$s = B_{avr}^{T+}i = (B_{avr}B_{avr}^{T})^{-1}B_{avr}i \qquad (9)$$

By using this estimated light source "s", the classification by the direction of illumination can be easily carried out. Now, an image "i" is an input image. Let "P" be its number of pixels, then the normal albedo matrix "B(l)" is expressed by Equation (10):

$$B^{(l)} = (n_1^{(l)}, n_2^{(l)}, \ldots, n_P^{(l)}) \qquad (10)$$

In the above, "$n_P$" is the product of the albedo of the pth pixel and a unit normal vector, as shown in Equation (11):

$$n_P = (n_{px}, n_{py}, n_{pz})^T \qquad (11)$$

The light source "s" is the product of the intensity of illumination and a unit vector in the direction of illumination, as shown in Equation (12):

$$s = (s_x, s_y, s_z)^T \qquad (12)$$

In the above-described face authentication device 1a according to the embodiment 2 of the invention, the feature data storage 61 has a plurality of sub-feature data storages 611 to 61n which store feature data items extracted from face image data items imaged under different imaging conditions with the feature data items being classified into the plurality of sub-feature data storages according to the difference of the imaging conditions, and the second similarity calculation unit 70a checks the feature data item extracted by the first feature extraction unit 20 against the feature data items stored in a sub-feature data storage, among the plurality of sub-feature data storages 611 to 61n, corresponding to the imaging condition closest to the prescribed imaging condition for the face image data item registered in the face image data registration unit 30, and calculates similarities between feature data items. This allows the feature data storage to be classified according to each imaging condition, and therefore allows personal identification to be performed with high accuracy regardless of an imaging environment for an input face image even if the imaging condition for an input face image data item is diversified.

A method of updating data in the feature data storage 61 will be specifically described here. First, the feature data classification unit 100b chooses a sub-feature data storage, among the plurality of sub-feature data storages 611 to 61n, corresponding to an imaging condition closest to the imaging condition for a new face image data item to be added. The feature data update judgment unit 120 then judges whether to add a feature data item of the new face image data item to the chosen sub-feature data storage or not. Specifically, the feature data update judgment unit 120 calculates values of distances between the feature data item to be added and all feature data items in the chosen sub-feature data storage.

Then, if no outlier statistically exists in the calculated values of distances, the feature data item concerned is added to the chosen sub-feature data storage. On the other hand, if a statistical outlier exists in the calculated values of distances, the feature data item concerned is not added to the chosen sub-feature data storage.

In this way, with the feature data update judgment unit 120 provided, when a feature data item of a new face image data item is added, the feature data item concerned can be classified into and stored in the most appropriate sub-feature data storage. Incidentally, for example, when an input image is acquired from a moving image, an identical person appears successively. In this case, the device is configured such that the identical person will not be registered, by using tracking determination or the like.

While there has been described what are at present considered to be preferred embodiments of the invention, it will be understood that various modifications and variations may be made thereto, and it is intended that appended claims cover all such modifications and variations as fall within the true spirit and scope of the invention.

INDUSTRIAL APPLICABILITY

As stated above, the face image authentication device according to the invention has an advantage of being able to perform personal identification with high accuracy regardless of an imaging environment for an input face image, and is useful as a face authentication device that uses face image data to authenticate a person, or the like.

The invention claimed is:

1. A face authentication device comprising:
   a first extraction unit which extracts a feature data item from an input face image data item;
   a face image data registration unit which registers a face image data item imaged under a prescribed imaging condition in it;
   a second extraction unit which extracts a feature data item from the face image data item registered in the face image data registration unit;
   a first calculation unit which checks the feature data items each extracted by the first and second extraction units against each other to calculate a similarity between both feature data items;
   a feature data storage for storing a plurality of feature data items each extracted from a plurality of face image data items of a plurality of persons imaged under an almost identical condition to the prescribed imaging condition;
   a second calculation unit which checks the feature data item extracted by the first extraction unit against the feature data items stored in the feature data storage to calculate similarities between feature data items, each time the input face image data item is inputted;
   a threshold setting unit which sets a threshold for judging whether the input face image data item and the face image data item registered in the face image data registration unit are of an identical person or not based on the similarities calculated by the second calculation unit, each time the input face image data item is inputted; and
   a determination unit which determines whether the input face image data item and the face image data item registered in the face image data registration unit are of an identical person or not by comparing the threshold set by the threshold setting unit and the similarity calculated by the first calculation unit.

2. The face authentication device according to claim 1, wherein the feature data storage has a plurality of sub-feature data storages for storing feature data items extracted from face image data items imaged under different imaging conditions with the feature data items being classified into the plurality of sub-feature data storages according to the difference of the imaging conditions, and wherein the second calculation unit checks the feature data item extracted by the first extraction unit against the feature data items stored in one of the sub-feature data storages corresponding to the imaging condition closest to the prescribed imaging condition for the face image data item registered in the face image data registration unit, and calculates the similarities between feature data items.

3. The face authentication device according to claim 2, wherein when a new face image data item is registered in the face image data registration unit, the device stores a feature data item of the new face image data item extracted by the second extraction unit in one of the plurality of sub-feature data storages corresponding to the imaging condition closest to that for the new face image data item.

4. The face authentication device according to claim 1, wherein the first calculation unit calculates the similarity between the feature data items extracted by the first and second extraction units based on a distance between both feature data items.

5. The face authentication device according to claim 1, wherein the second calculation unit calculates the similarities between the feature data item extracted by the first extraction unit and the feature data items stored in the feature data storage based on distances between feature data items.

6. The face authentication device according to claim 1, wherein the threshold setting unit, based on an average value and a variance value of the similarities calculated by the second calculation unit, sets the threshold for judging whether the input face image data item and the face image data item registered in the registration unit are of an identical person or not.

7. A face authentication method comprising:
   a first extraction step of extracting a feature data item from an input face image data item;
   a second extraction step of, referring to a face image data registration unit in which a face image data item imaged under a prescribed imaging condition is registered, extracting a feature data item from the face image data item registered in the face image data registration unit;
   a first calculation step of checking the feature data items each extracted in the first and second extraction steps against each other to calculate a similarity between both feature data items;
   a second calculation step of, referring to a feature data storage for storing a plurality of feature data items each extracted from a plurality of face image data items of a plurality of persons imaged under an almost identical condition to the prescribed imaging condition, checking the feature data item extracted in the first extraction step against the feature data items stored in the feature data storage to calculate similarities between feature data items, each time the input face image data item is inputted;
   a threshold setting step of, based on the similarities calculated in the second calculation step, setting a threshold for judging whether the input face image data item and the face image data item registered in the face image data registration unit are of an identical person or not, each time the input face image data is inputted; and
   a determination step of determining whether the input face image data item and the face image data item registered in the face image data registration unit are of an identical person or not by comparing the threshold set in the threshold setting step and the similarity calculated in the first calculation step.

8. A face authentication program recorded in a memory device causing a computer to execute:
- a first extraction step of extracting a feature data item from an input face image data item;
- a second extraction step of, referring to a face image data registration unit in which a face image data item imaged under a prescribed imaging condition is registered, extracting a feature data item from the face image data item registered in the face image data registration unit;
- a first calculation step of checking the feature data items each extracted in the first and second extraction steps against each other to calculate a similarity between both feature data items;
- a second calculation step of, referring to a feature data storage for storing a plurality of feature data items each extracted from a plurality of face image data items of a plurality of persons imaged under an almost identical condition to the prescribed imaging condition, checking the feature data item extracted in the first extraction step against the feature data items stored in the feature data storage to calculate similarities between feature data items;
- a threshold setting step of, based on the similarities calculated in the second calculation step, setting a threshold for judging whether the input face image data item and the face image data item registered in the face image data registration unit are of an identical person or not; and
- a determination step of determining whether the input face image data item and the face image data item registered in the face image data registration unit are of an identical person or not by comparing the threshold set in the threshold setting step and the similarity calculated in the first calculation step.

* * * * *